March 14, 1967  O. E. LARSEN  3,309,436
EXTRUSION METHOD
Filed Oct. 21, 1965
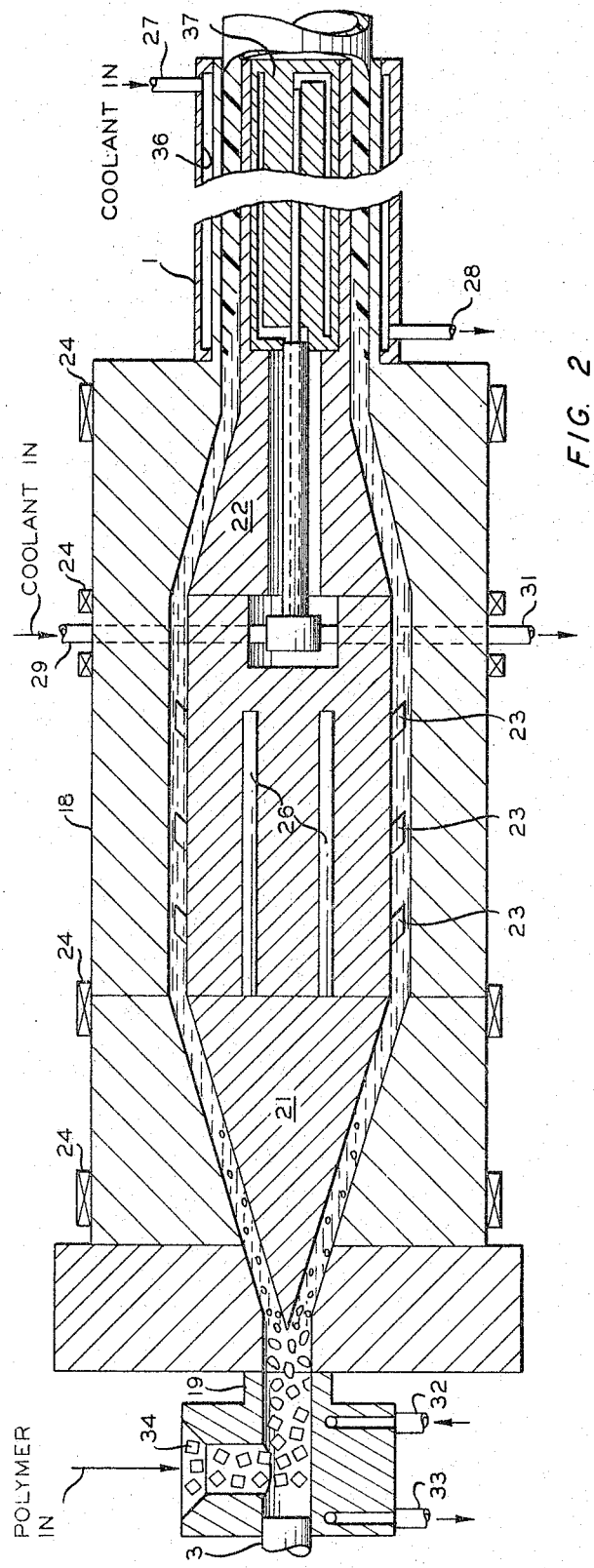
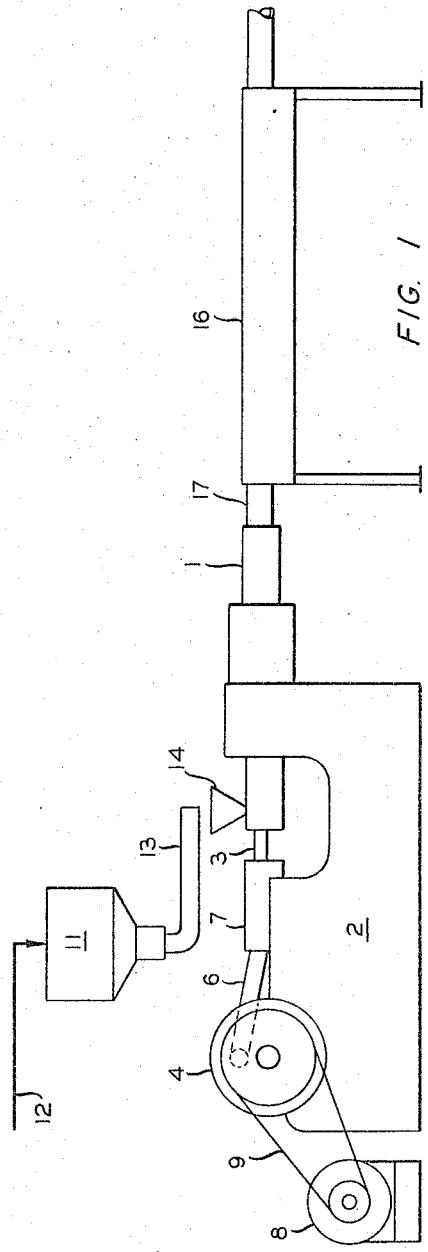
INVENTOR
O. E. LARSEN
BY Young and Quigg
ATTORNEYS

United States Patent Office 3,309,436
Patented Mar. 14, 1967

3,309,436
EXTRUSION METHOD
Olaf E. Larsen, Bartlesville, Okla., assignor to Phillips Petroleum Company, a corporation of Delaware
Filed Oct. 21, 1965, Ser. No. 499,242
3 Claims. (Cl. 264—25)

This invention relates to methods of extruding plastic materials. In one aspect, this invention relates to methods for producing elongated articles of preselected cross sectional configuration from thermoplastic materials. In another aspect, this invention relates to dynamic extrusion with a long land die.

The concept of dynamic extrusion includes the successive steps of compacting and transferring a multitude of thermoplastic particles through a heated zone to melt the particles into a pliable mass and then advancing the pliable mass into a long land die of particular cross sectional configuration wherein the thermoplastic material solidifies to its solid state before leaving the die. The foregoing steps are effected by means of a piston which reciprocates in a passageway to force the particles of thermoplastic material, fed to the extruder, through the heated zone and the long land die. The dynamic extrusion method requires a considerable amount of heat in order to melt the thermoplastic particles so that they can be passed through the plastification chamber and into the long land die. Also, the heated portion of the passageway in a dynamic extrusion apparatus must be quite long in order for the thermoplastic particles to have a residence time sufficient to plasticate them. These disadvantages of previous dynamic extrusion methods and apparatus have delayed acceptance of the dynamic extrusion concept on a commercial scale because of the difficulty involved in heating the thermoplastic particles to a plastic state using external heaters and because of the resultant limitations placed on the production capacity of previous dynamic extrusion apparatus.

According to this invention, these and other disadvantages of previous dynamic extrusion methods and apparatus are overcome by applying mechanical impulse forces to the thermoplastic particles at a frequency which causes the particles to become heated due to the action of the impulse forces. The heat obtained by the impulse forces on the particles in accordance with this invention reduces the amount of heat which must be supplied to the heated zone to melt the particles. It is also within the spirit and scope of this invention to apply the impulse forces at a high enough rate to generate all of the heat necessary to plasticate the particles from the impulse forces. The concept of this invention also increases the capacity of the dynamic extruder because more rapid and uniform heating of the particles is achieved by means of the impulse forces thus increasing extrusion rates.

Accordingly, it is an object of this invention to provide an improved method for dynamic extrusion.

Another object of this invention is to provide a method of producing an elongated article of preselected cross sectional configuration from granular thermoplastic material by dynamic extrusion techniques.

A further object of this invention is to reduce the heat input required in a conventional dynamic extrusion method.

Still another object of this invention is to provide a method of dynamic extrusion wherein the extrudate is smooth and free from die marks and the like.

These and other objects of the invention will become apparent to one skilled in the art after studying the following detailed description, the appended claims, and the accompanying drawings wherein:

FIGURE 1 is a diagrammatic illustration of a dynamic extrusion apparatus of the present invention;

FIGURE 2 is a cross sectional view of the plasticizing chamber and long land die of a dynamic extruder illustrating the transformation of the granular particles to a finished product of preselected cross sectional configuration.

The method of producing an elongated article of preselected cross sectional configuration from a granular thermoplastic material which is capable of becoming plastic by the application of heat in accordance with this invention comprises supplying said granules to a passageway having a heating zone and a discharge end portion including a cooling zone which defines the preselected cross sectional configuration. Mechanical impulse forces are applied to the granules in the passageway at a frequency which is sufficient to compact and generate heat which will melt the granules to form a pliable mass. Although it is sufficient for the purpose of this invention to apply the impulse forces at a frequency which will plasticate the thermoplastic granules, it is preferred that the impulse forces be applied at a frequency within the range of about 200 to about 600 per minute. The pliable mass is advanced through the heating zone in the passageway and through the discharge end portion including the cooling zone of the passageway by continuing the application of the impulse forces. This results in the formation of an elongated extrudate in a continuous manner.

Referring now to the drawings, wherein like reference numerals are used to denote like elements, and particularly to FIGURE 1, the invention will be described in more detail. Many controls, switches, valves, etc., not necessary in explaining the invention to one skilled in the art, have been omitted from the drawings for the sake of clarity.

The dynamic extrusion apparatus which can be used in the practice of this invention includes a long land die section 1 supported by a frame 2. A piston 3 connected to a fly wheel 4 by means of a connecting rod 6 and a crosshead 7 is mounted for reciprocal motion in cooperation with die 1. A motor 8 will serve to impart rotational motion to fly wheel 4 through the medium of a belt 9.

A thermoplastic material in particle form can be charged to storage hopper 11 by conveying means 12. A spout 13 will serve to transmit the particles from storage hopper 11 to a feed hopper 14 which brings the particles into a position where they can be contacted by piston 3.

A support 16 is situated to receive the extruded elongated article 17 after it issues from the long land die 1. Support 16 can be provided with means for further cooling the extrudate if desired.

FIGURE 2 of the drawings illustrates a plasticizing chamber 18 connected to the long land die 1 and having a cylindrical inlet end 19 which will accommodate piston 3. A mandrel 21 serves to define an annulus with the inside of the plasticizing chamber 18 through which the thermoplastic material can pass. As indicated, the mandrel 21 can be constructed of two or more parts which can be attached together by threaded sections or by bolts or the like. When a rod or similar solid extrudate is desired, the forward end 22 of mandrel 21 can be removed. The mandrel 21 is provided with a plurality of circumferential rows of teeth or baffles 23. The teeth or baffles 23 are inclined in the direction of flow through the annulus formed between the mandrel 21 and the interior surface of the plasticizing chamber 18, the flow being from left to right as viewed in FIGURE 2. A plurality of band heaters 24 and cartridge heaters 26 will serve to supply the heat necessary to maintain the thermoplastic material in its plastic state. Other heating means including fluid circulating conduits or the like can be used to supply the necessary heat if desired.

The long land die 1 is provided with exterior cooling means including conduits 27 and 28 which serve to circulate a coolant through the die bushing 36. The interior of the long land die 1 can be cooled by circulating a coolant through conduits 29 and 31 to the cylindrical portion 37 of the forward end 22 of mandrel 21. Similarly, the heat created due to the friction between piston 3 and inlet end 19 can be removed by circulating a coolant through conduits 32 and 33.

Further details of a dynamic extrusion apparatus which can be used in the practice of this invention can be obtained by reference to copending commonly assigned applications Ser. No. 389,348, filed Aug. 13, 1964, and 389,392, filed Aug. 13, 1964, both of which are incorporated herein by reference.

In practicing the method of this invention, granules 34 of thermoplastic material are introduced at a controlled rate into cylinder 19 whereupon the forward strokes of the reciprocating piston 3 compact and force them into plasticizing chamber 18. The mechanical impulse forces move the mass of compacted granules into the plasticizing chamber 18. By operating the piston 3 at a frequency sufficient to generate heat to cause the granular thermoplastic to melt, the mass begins to become molten as it enters the annulus in the plasticizing chamber. The teeth 23 and their inclination to the direction of flow serve to prevent backflow when the piston 3 is on its backstroke.

The baffled or toothed mandred 21 serves two functions First, it aids in mixing the thermoplastic material to dissipate the heat from heaters 24 and 26 and, second, it inhibits backflow between successive strokes of the piston. When operating at sufficiently high stroke speed to generate most or all of the heat through the action of the piston on the thermoplastic material, heat addition is no longer a problem. Thus, it is within the spirit and scope of the invention to remove the baffles 23 from the mandrel 21. Further, the entire mandrel can be removed from the plasticizing chamber if desired. In particular, when extruding thermoplastic materials which present a stability problem it may be advantageous to operate without the baffles or even with the entire mandrel removed since the resulting smooth bore is free of areas where polymer can hang up and degrade. In instances where the mandrel is removed from the plasticizing chamber, this chamber is preferably made smaller in diameter.

By operating piston 3 at a high rate to plasticate the granules of thermoplastic material in accordance with this invention, the heat required from heaters 24 and 26 to melt the thermoplastic material can be reduced. The following examples serve to illustrate the improved results obtained by applying the mechanical impulse forces at a frequency in accordance with this invention.

*Examples*

An ethylene-butene copolymer of 1.4 HLMI (ASTM D1238–62T, Condition F) having a density of 0.956 (ASTM D1505T) was extruded into one-inch, Schedule 40 pipe in accordance with the invention. The copolymer contained 1 weight percent glycerin and 2½ weight percent carbon black based on the weight of the copolymer. The following data illustrate the improved results obtained by the invention.

EXAMPLE

| Run No. | Impulse Frequency (r.p.m.) | Extrusion Rate (inches/min.) | Motor Power (amps) | Melt Temperature (° F.) | Heater Power (kilowatts) |
|---|---|---|---|---|---|
| 1 | 201 | 36 | 20.5 to 23 | 491 | 2.95 |
| 2 | 250 | 37½ | 25 to 28.5 | 478 | 2.77 |
| 3 | 350 | 36 | 27 to 28 | 498 | 1.14 |

It is apparent from the data reflected above that as the revolutions per minute increases (mechanical impulse forces), the heater power necessary to melt and maintain the granules of thermoplastic material in a pliable or plastic state decreases.

The use of an ethylene-butene copolymer in the examples is done so only for the purpose of illustrating the invention. Any thermoplastic material such as a natural or synthetic resin can be extruded by the practice of the invention. Exemplary materials which can be extruded by this invention include polyolefins, polyamides, polyesters, fluorocarbon polymers, acetal resins, polycarbonates, vinyl polymers, acrylic polymers, polystyrene, and the like. Olefin polymers such as polyethylene and ethylene-butene copolymers having a molecular weight in excess of 100,000 are particularly suited for extrusion by this invention.

Although the invention has been described in connection with the production of a pipe or rod, it is evident that extrudates of irregular cross sections can be extruded in accordance with the concept of this invention. Further, the invention can also be used for coating wires, cables, etc.

Although the invention has been described in considerable detail, it must be understood that such detail is for that purpose only and that many variations and modifications can be made by one skilled in the art without departing from the spirit and scope of the invention.

I claim:
1. A method of producing an article of indefinite length from a thermoplastic material comprising the steps of:
   introducing a thermoplastic material in particulate form into a chamber having an outlet in the form of a die;
   applying impulse forces to said thermoplastic material in particulate form to plasticize a portion thereof to form a partially plasticized mass and to transmit forces through said partially plasticized mass downstream in said chamber;
   moving the partially plasticized mass through said chamber by means of said impulse forces to form a substantialy totally plasticized mass of thermoplastic material, a substantial portion of the heat required to complete plastification being obtained from said impulse forces; and
   forcing the substantially totally plasticized mass of thermoplastic material through said chamber and the outlet thereof, wherein the mass solidifies, in a continuous manner by said impulse forces applied to said material in particulate form to produce said article of indefinite length.

2. A method according to claim 1 wherein said impulse forces are applied at a frequency within the range of about 200 to about 600 per minute.

3. A method according to claim 2 wherein said impulse forces are applied at a frequency of about 350 per minute.

References Cited by the Examiner

UNITED STATES PATENTS

| 2,358,963 | 9/1944 | Davis | 18—12 |
| 2,888,711 | 6/1959 | Finlayson | 264—23 |
| 2,936,483 | 5/1960 | Deakin | 264—127 |
| 3,022,814 | 2/1962 | Bodine | 264—22 |
| 3,068,513 | 12/1962 | Chaffin | 264—127 |
| 3,071,809 | 1/1963 | Lerch | 264—23 |
| 3,082,476 | 3/1963 | Bunch | 264—176 |

FOREIGN PATENTS 620,241 11/1962 Belgium.
981,203 1/1965 Great Britain.

ROBERT F. WHITE, *Primary Examiner.*

R. B. MOFFITT, *Assistant Examiner.*